(No Model.)
I. K. HOLLINGER.
IRON FENCE AND GATE.
No. 528,164. Patented Oct. 30, 1894.
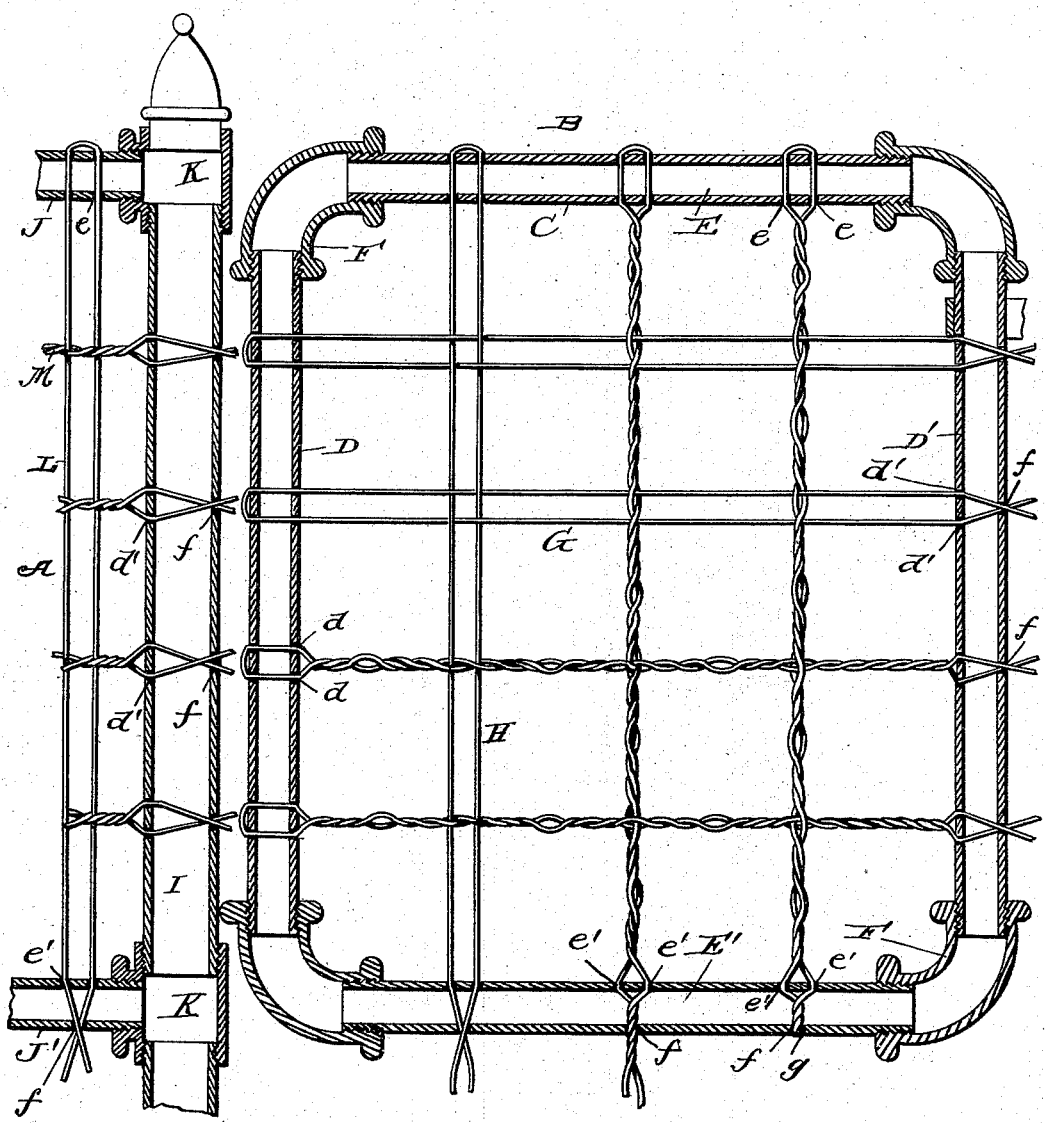
Witnesses:
C. H. Daeder
N. F. Matthews.
Inventor
I. K. Hollinger
By James J. Sheehy
Attorney

UNITED STATES PATENT OFFICE.

ISAAC K. HOLLINGER, OF GREENVILLE, OHIO.

IRON FENCE AND GATE.

SPECIFICATION forming part of Letters Patent No. 528,164, dated October 30, 1894.

Application filed July 11, 1894. Serial No. 517,223. (No model.)

*To all whom it may concern:*

Be it known that I, ISAAC K. HOLLINGER, a citizen of the United States, residing at Greenville, in the county of Darke and State of Ohio, have invented certain new and useful Improvements in Fences and Gates; and I do declare the following to be a full, clear, and exact description of the invention, such as will enable others skilled in the art to which it appertains to make and use the same.

My invention relates to improvements in that class of fences and gates which are constructed of pipe and wire; and its novelty will be fully understood from the following description and claims when taken in conjunction with the annexed drawing, in which the figure is a vertical, sectional view illustrating a portion of a fence section and a gate constructed in accordance with my invention.

Referring by letter to said drawing—A, indicates a portion of a fence section, and B, indicates a gate; both of which are formed by a frame of pipe and a series of vertical and horizontal intersecting bars of wire as will be presently described. The frame C, of the gate comprises the vertical pipes D, D', and the horizontal pipes E, E', connected at their ends by elbows F, or in any other suitable manner; and the pipes D, and E, are provided at intervals in their length and at diametrically opposite points in their sides with the pairs of aligned apertures $d$, $e$, while the pipes D', and E', are provided in their inner sides at intervals in their length with the pairs of apertures $d'$, $e'$, and in their opposite or outer sides with the single apertures $f$, said apertures $f$, being arranged midway between the planes of the apertures $d'$, $e'$, as shown, for a purpose presently described.

G, indicates the horizontal bars of the gate, and H, indicates the vertical bars which are respectively formed from a single piece of wire. In connecting the bars G, to the frame C, I first bend the pieces of wire forming the bars upon themselves and pass the ends of the same through the aligned apertures $d$, of the pipe D. I then draw the ends of the wires across the frame and pass the same through the apertures $d'$, of the pipe D', after which I bring the ends together and pass the same through the apertures $f$, of said pipe; that is to say I pass the ends of the wire forming each bar through a single aperture $f$. When this has been done the ends of the wires which extend through the apertures $f$, are tightly twisted in order to secure the bars, after which the wires are cut at a point close to the pipe D', as indicated by $g$, and the twisted ends are pushed into said pipe where they will be out of sight and will not detract from the neat appearance of the gate. When the twisted ends of the wires forming the horizontal bars G, are thus pushed within the pipe D', they will not be liable to become untwisted and will therefore securely hold the bars stiff and taut, and this without the employment of nails, screws, or other fastening devices.

The wires forming the vertical bars H, of the gate are connected to the pipes E, and E', in precisely the same manner as the wires of the bars G, are connected to the pipes D, D'; and after the said bars H, have been placed in position, the wires of both series of bars are twisted between the intersecting points so that each series will serve to brace and strengthen the other and form a stiff, strong, and durable net work.

I, indicates one of the vertical pipes of the fence section A, to which the gate B, may be connected in any approved manner, and J, J', indicate the upper and lower horizontal pipes which may be connected with the vertical pipe I, and with another vertical pipe at the opposite end of the section (not illustrated) through the medium of T-unions as K, or other suitable connecting devices. The vertical pipe I, as well as the vertical pipe, not illustrated, may be buried in the ground and suitably anchored in the ground, or may be fixedly connected by the unions K, with pipe sections connected to anchors so as to hold the fence section stiff and rigid. Said vertical pipe I, is shown as provided with apertures $d'$, $f$, similar to those of the pipe D', of the gate, in which case the vertical pipe (not illustrated) would be provided with apertures $d$, similar to those of the pipe D, of the gate, while the pipes J, J', are provided with apertures $e$, and apertures $e'$, and $f$, similar to those of the pipes E, and E', of the gate.

The horizontal and vertical bars L, M, of the fence section are respectively formed of a single piece of wire and they are secured to the pipes I, J, J', and the vertical pipe (not illustrated) in precisely the same manner that the bars G, H, of the gate are secured to the pipes D, D', and E, E'. The wires forming the said bars L, M, are furthermore twisted in a manner similar to the wires forming the bars of the gate, and they therefore need not be further described.

It will be seen from the foregoing that I have provided a very strong and durable fence and gate which may be constructed without the use of nails or other fastening devices and without the employment of skilled labor, and which may therefore be put up at but a slight cost as compared with other metallic fences and gates. It will also be seen that my improved fence and gate while very cheap and easy to construct, is very neat and ornamental in appearance and is therefore adapted for use in front of dwellings in cities and towns.

While I have in some respects specifically described the construction and relative arrangement of my improved fence in order to impart a full, clear, and exact understanding of the same, I do not desire to be understood as confining myself to such construction and arrangement as such changes or modifications may be made in practice as fairly fall within the scope of the invention.

Having described my invention, what I claim is—

1. A fence section or a gate comprising a vertical pipe having the pairs of aligned apertures $d$, at intervals in its length, a vertical pipe having the pairs of apertures $d'$, at intervals in its length in its inner side and the apertures $f$, in its outer side, said apertures $f$, being disposed in planes between those of the apertures $d'$ a horizontal pipe having the pairs of aligned apertures $e$, at intervals in its length, a horizontal pipe having the pairs of apertures $e'$, at intervals in its length in its inner side and the apertures $f$, in its outer side, said apertures $f$ being disposed in planes between those of the apertures $e'$ a suitable means for connecting the said bars so as to form a frame, the horizontal bars formed from pieces of wire which are bent upon themselves and have their ends passed through the apertures $d$, of one vertical pipe and the apertures $d'$, of the other vertical pipe and brought together and passed through the apertures $f$, of said latter pipe and twisted, and the vertical bars intersecting the horizontal bars and formed from pieces of wire and connected to the horizontal pipes in the same manner that the horizontal bars are connected to the vertical pipes, the wires of the horizontal and vertical bars being twisted substantially as specified.

2. A fence section or gate comprising a pipe having pairs of aligned apertures $d$, at intervals in its length, a second pipe having the pairs of apertures $d'$, at intervals in its length in its inner side and the apertures $f$, in its outer side—said apertures $f$, being disposed in planes between those of the apertures $d'$ and bars formed from pieces of wire which are bent upon themselves and have their ends passed through the apertures $d$, of one pipe and the apertures $d'$, of the other pipe and brought together and passed through the apertures $f$, of said latter pipe and twisted, substantially as specified.

In testimony whereof I affix my signature in presence of two witnesses.

ISAAC K. HOLLINGER.

Witnesses:
FRANK S. GORDON,
D. P. IRWIN.